(12) United States Patent
Kimura et al.

(10) Patent No.: US 7,428,122 B2
(45) Date of Patent: Sep. 23, 2008

(54) HERMETICALLY SEALED DISK DRIVE WITH LOW HEIGHT

(75) Inventors: Shinichi Kimura, Kanagawa (JP); Hiroki Kitahori, Kanagawa (JP); Hirofumi Nozaki, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 374 days.

(21) Appl. No.: 10/884,235

(22) Filed: Jul. 1, 2004

(65) Prior Publication Data

US 2005/0046996 A1 Mar. 3, 2005

(30) Foreign Application Priority Data

Sep. 3, 2003 (JP) .............................. 2003-310984

(51) Int. Cl.
| | |
|---|---|
| *B25G 3/00* | (2006.01) |
| *F16D 1/00* | (2006.01) |
| *F16D 1/09* | (2006.01) |
| *F16G 11/00* | (2006.01) |
| *F16B 7/04* | (2006.01) |
| *G11B 33/14* | (2006.01) |
| *G11B 5/012* | (2006.01) |
| *G11B 17/08* | (2006.01) |
| *G11B 17/22* | (2006.01) |
| *G11B 17/04* | (2006.01) |
| *G11B 17/03* | (2006.01) |
| *F16J 15/08* | (2006.01) |
| *F16J 15/10* | (2006.01) |
| *G06F 1/16* | (2006.01) |
| *H05K 5/00* | (2006.01) |
| *H05K 7/00* | (2006.01) |

(52) U.S. Cl. .................. 360/97.03; 403/13; 403/14; 403/408.1; 360/98.01; 720/648; 720/655; 277/650; 277/652; 361/685

(58) Field of Classification Search .............. 360/97.01, 360/97.02, 91.03; 720/648, 655; 361/685, 361/687; 403/13, 14, 408.1
See application file for complete search history.

(56) References Cited

U.S. PATENT DOCUMENTS 5,029,027 A * 7/1991 Sleger ..................... 360/97.03
5,627,699 A * 5/1997 Ota et al. .................. 360/97.02

(Continued)

FOREIGN PATENT DOCUMENTS

JP 2002-015553 A 1/2002

*Primary Examiner*—Andrea Wellington
*Assistant Examiner*—Adam B Dravininkas
(74) *Attorney, Agent, or Firm*—Townsend and Townsend and Crew LLP; Rambod Nader (57) ABSTRACT

An assembly structure low in height and suitable for downsizing and for high hermeticity sealing in a micro hard disk drive is provided. Burrings projecting toward a top cover and having an internal thread cut are formed on a base plate where the top cover is screw-fastened to the base plate, the base plate accommodating a functional unit such as a disk and a head. Burrings are formed extendedly upward on flat portions of recesses at certain corners of the top cover. These burrings have a diameter larger than that of the burrings of the base plate. The burrings of the base plate are fitted into the burrings to be screw-fastened with top cover fastening screws. After attaching the top cover to the base plate, a covering seal is applied to cover the respective top faces of the top cover, base plate, and the top cover screws.

15 Claims, 8 Drawing Sheets

U.S. PATENT DOCUMENTS

| | | | |
|---|---|---|---|
| 5,898,537 A * | 4/1999 | Oizumi et al. | 360/97.01 |
| 6,127,819 A * | 10/2000 | Ouchi | 324/173 |
| 6,373,654 B1 * | 4/2002 | Iwahara et al. | 360/97.01 |
| 6,417,985 B1 * | 7/2002 | Noda | 360/97.01 |
| 6,419,395 B1 * | 7/2002 | Taylor | 384/42 |
| 6,525,931 B2 * | 2/2003 | Yagenji et al. | 361/685 |
| 6,567,237 B2 * | 5/2003 | Iwahara et al. | 360/97.02 |
| 6,661,604 B2 * | 12/2003 | Hashizume et al. | 360/97.02 |
| 6,721,128 B1 * | 4/2004 | Koizumi et al. | 360/97.02 |
| 6,950,275 B1 * | 9/2005 | Ali et al. | 360/97.02 |
| 6,958,844 B2 * | 10/2005 | Bauer et al. | 359/265 |
| 6,958,884 B1 * | 10/2005 | Ojeda et al. | 360/97.02 |
| 7,012,805 B2 * | 3/2006 | Shah et al. | 361/685 |
| 7,206,164 B2 * | 4/2007 | Hofland et al. | 360/97.01 |
| 2002/0131196 A1 * | 9/2002 | Oishi et al. | 360/86 |
| 2004/0070867 A1 * | 4/2004 | Kudo et al. | 360/97.01 |
| 2004/0126184 A1 * | 7/2004 | Yasuda | 403/408.1 |
| 2004/0240174 A1 * | 12/2004 | Ooka et al. | 361/687 |
| 2005/0013107 A1 * | 1/2005 | Desai et al. | 361/685 |
| 2005/0180044 A1 * | 8/2005 | Lee | 360/97.01 |

* cited by examiner

FIG.9A the flat portion
32
33
the flat portion top face

FIG.9B 36 covering seal

B
B top face

FIG.9C the flat portion
32 bottom view

FIG.9D 37 screw seal

32 bottom view

FIG.10

HERMETICALLY SEALED DISK DRIVE WITH LOW HEIGHT

BACKGROUND OF THE INVENTION

The present invention relates to disk drives and, more particularly, to a small disk drive low in height and excellent in sealing properties.

Various types of portable recording mediums are provided for various devices including personal computers (PC) and digital cameras to store data. Efforts have been made in recent years to provide recording media having a small size and a large storage capacity. For example, a small, portable magnetic disk drive has been proposed. This proposed disk drive has a new assembly construction based on the Compact Flash® commercially available from SanDisk Corporation, i.e., one of standard small memory cards.

A large-capacity miniature hard magnetic disk drive conforming to the standard of Compact Flash Type 2 is provided with a one-inch diameter magnetic disk having a storage capacity of 1 GB, and has a weight on the order of only 16 g. The PC card to be used in combination with the disk drive, similarly to the disk drive, is based on standards such as the standards of Compact Flash Type 2. The disk drive can be inserted in the PC card.

This portable, miniature hard disk drive is provided, in addition to the magnetic disk (disk) for storing data, a spindle motor for rotating the disk, a read/write head for writing and reading data to and from the disk, and an actuator for moving the read/write head in a direction along a radius of the disk. Functional components including a disk, a spindle motor, a read/write head and an actuator of such a miniature hard disk drive having compact construction are formed very minutely. Japanese Patent Laid-open No. 2002-15553 (pp. 5-6, FIGS. 3 and 4) discloses the assembly structure of a small disk drive, which meets Compact Flash standards.

BRIEF SUMMARY OF THE INVENTION

In order to meet the Compact Flash standards, micro hard disk drives have limitation of height and restriction on mechanism elements and fasteners for a case. Accordingly, this needs an assembly structure suitable for downsizing. When foreign particles such as dust are entrapped into the device, they cause a head crush to lead to a critical defect. Therefore, there is a demand for a sealing structure having good sealing properties.

A feature of the present invention is to provide a small disk drive that is low in height and is readily assembled.

Another feature of the invention is to provide a small disk drive having an enhanced hermetic structure.

In accordance with an aspect of the present invention, a disk drive comprises: a functional unit including a disk as an information storage medium; a case for containing the functional unit; and a cover for covering the functional unit contained in the case; wherein the case is provided with a burring having an internal thread cut on its inner wall and projecting toward the cover, the burring being formed on a region at which the cover is attached to the case; and the cover is screw-fastened at the burring.

The cover has a flat portion in a recess formed on a region at which the cover is screw-fastened to the case, and the burring is fitted into a hole formed on the flat portion to be screw-fastened.

Alternatively, the cover has a flat portion in a recess formed on a region at which the cover is screw-fastened to the case; the flat portion in the recess is provided with a burring having a diameter larger than that of the burring of the case and projecting in the projecting direction of the burring of the case; and the burring of the case is fitted into the burring of the cover to be screw-fastened.

Top faces of the case, the cover, and the fastening regions are covered with a seal; and the fastening regions on a bottom face of the case are covered with seals. Each of the seals may preferably be an adhesive tape.

In accordance with another aspect of the invention, a disk drive comprises: a disk; a head; a cable plate for holding a connector to which a cable for transmitting a signal from the head is connected; a case for containing the disk, the head, and the cable plate; and a cover for covering the disk, the head, and the cable plate contained in the case; wherein the case is provided with a first burring having an internal thread cut on its inner wall and projecting toward the cover, the first burring being formed on a region at which the cable plate is attached to the case; the cable plate is screw-fastened at the first burring; the case is provided with a second burring having an internal thread cut on its inner wall and projecting toward the cover, the second burring being formed on a region at which the cover is attached to the case; and the cover is screw-fastened at the second burring.

The cover has a flat portion in a recess formed on a region at which the cover is screw-fastened to the case; and the second burring is fitted into a hole formed on the flat portion to be screw-fastened.

Alternatively, the cover has a flat portion in a recess formed on a region at which the cover is screw-fastened to the case; the flat portion in the recess is provided with a third burring having a diameter larger than that of the second burring and projecting in the projecting direction of the second burring; and the second burring is fitted into the third burring to be screw-fastened.

Top faces of the case, the cover, and the fastening regions are covered with a seal, and the fastening regions on a bottom face of the case are covered with seals. Each of the seals may preferably be an adhesive tape.

In accordance with another aspect of the invention, a disk drive comprises: a functional unit including a disk as an information storage medium; a case for containing the functional unit; a cover for covering the functional unit contained in the case; a wiring board at one of whose edges a connector is disposed, the wiring board being attached to the case; and a shock-absorbing member for covering sides of the case other than a side at which the connector is disposed; wherein the case is provided with a burring having an internal thread cut on its inner wall and projecting toward the cover, the burring being formed on a region at which the cover is attached to the case; and the cover is screw-fastened at the burring.

In accordance with another aspect of the invention, a disk drive comprises: a bottom cover; a wiring board at one of whose edges a connector is disposed, the wiring board being contained in the bottom cover; a base plate disposed on the wiring board in such a fashion that the connector is located at one side thereof; a disk and a head contained in the base plate; a top cover for covering a top face of the base plate; and a shock-absorbing member for covering sides of the base plate other than the side at which the connector is located; wherein the base plate is provided with a burring having an internal thread cut on its inner wall and projecting toward the top cover, the burring being formed on a region at which the top cover is screw-fastened; and the top cover is screw-fastened at the burring.

In accordance with another aspect of this invention, the magnetic disk drive comprises: a bottom cover; a wiring board at one of whose edges a first connector is disposed, the wiring board being contained in the bottom cover; a base plate disposed on the wiring board in such a fashion that the first connector is located at one side thereof; a magnetic disk and a head contained in the base plate; a cable plate for holding a second connector to which a cable for transmitting a signal from the head is connected; a top cover for covering top faces of the magnetic disk, the head, and the cable plate; and a frame bumper for covering sides of the base plate other than the side at which the first connector is located, the frame bumper being a shock-absorbing member; wherein the base plate is provided with a first burring having an internal thread cut on its inner wall and projecting toward the top cover, the first burring being formed on a region at which the cable plate is attached to the base plate; the cable plate is screw-fastened at the first burring; the base plate is provided with a second burring having an internal thread cut on its inner wall and projecting in the direction of the top cover, the burring being formed on a region at which the top cover is attached to the base plate; and the top cover is screw-fastened at the second burring.

According to embodiments of present invention, it is possible to provide a small disk drive which is low in height and is readily assembled. Further, it is possible to provide a small disk drive having a sealing structure improved in hermeticity.

DETAILED DESCRIPTION OF THE INVENTION

Figure 1:
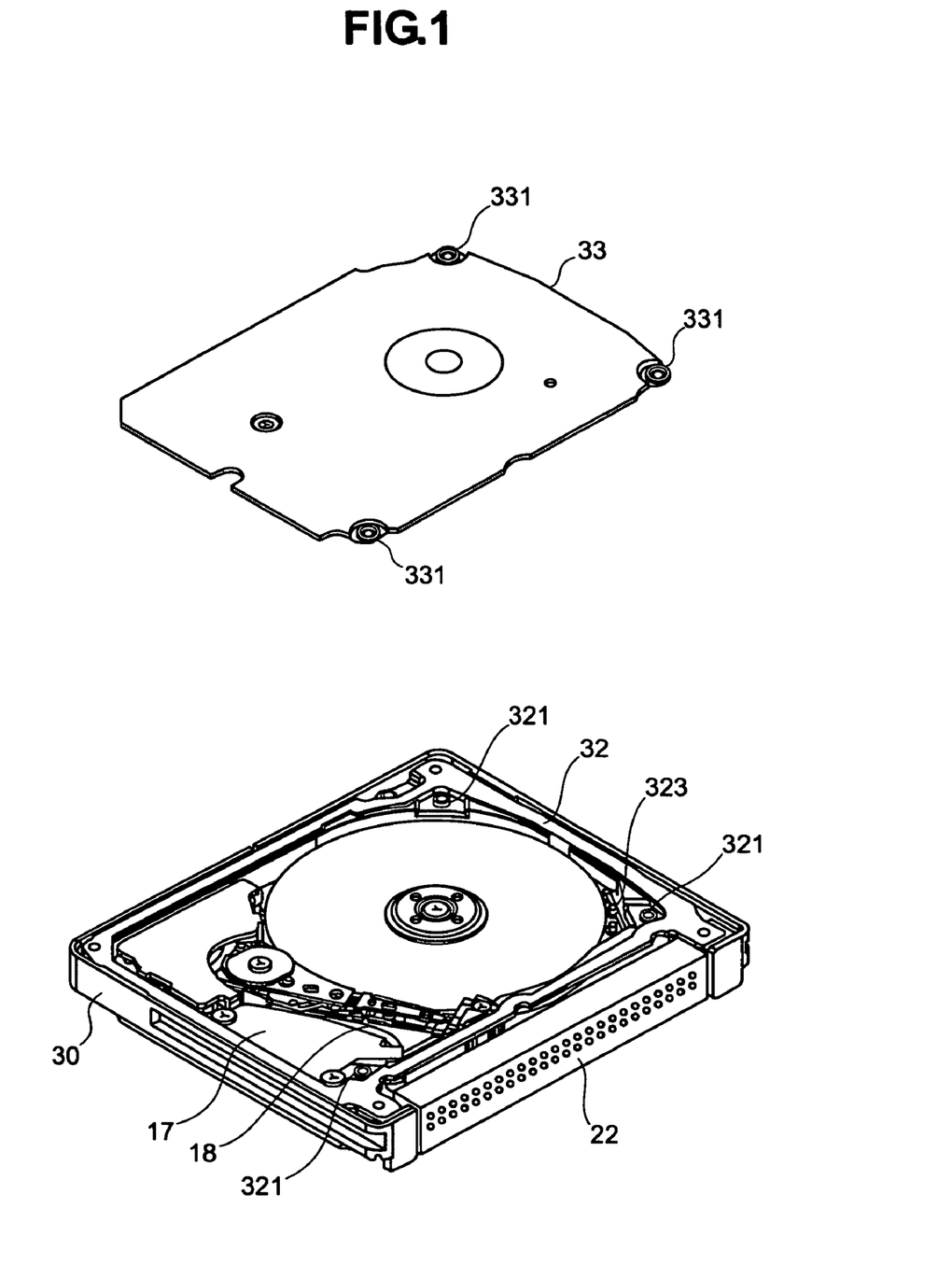
FIG. 1 is a perspective view showing an internal structure of a disk drive according to one embodiment of the present invention.
Figure 4:
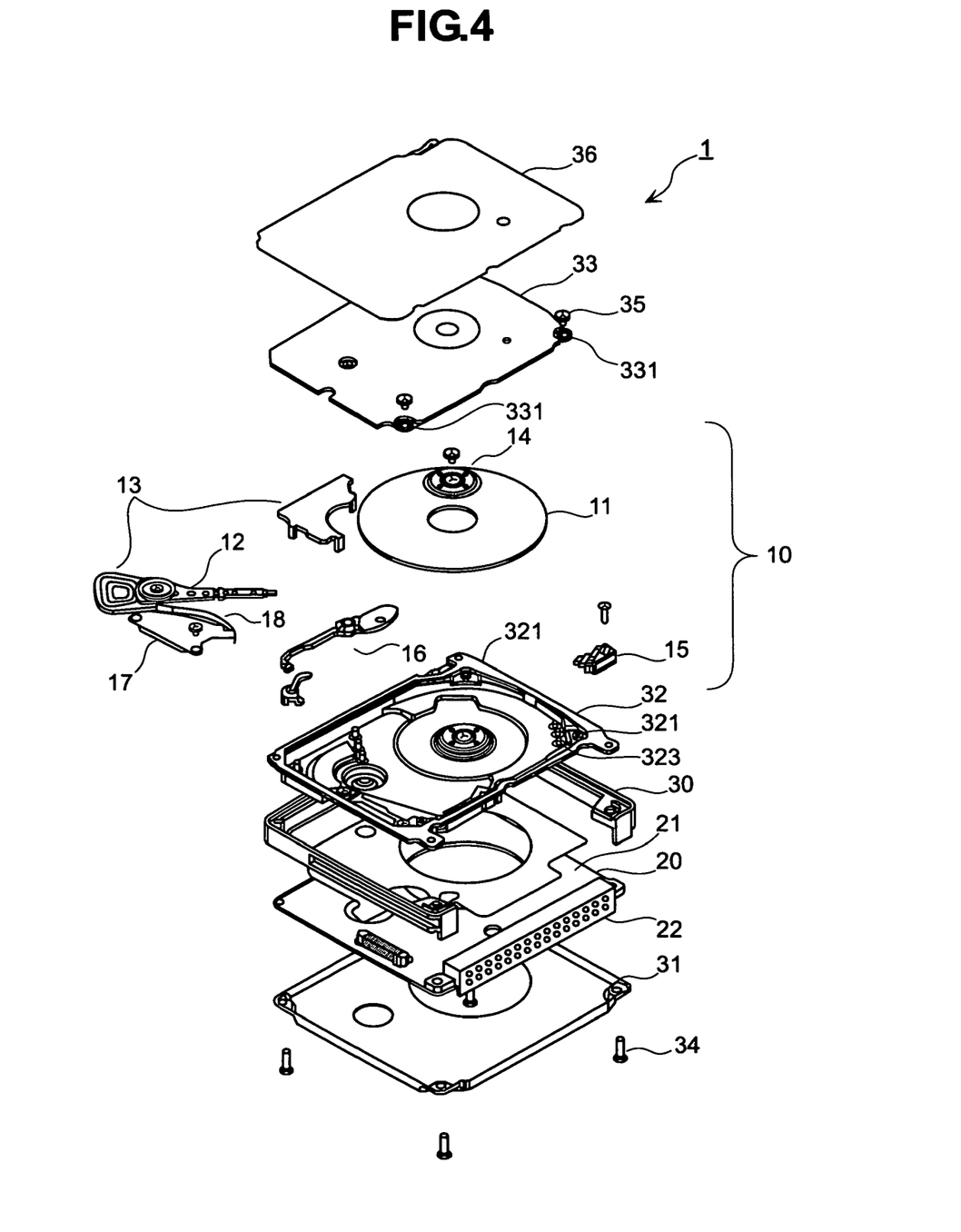
FIG. 4 is an exploded perspective view showing an assembly structure of the disk drive according to the embodiment of the present invention.

FIG. 4 shows an assembly structure of a disk drive 1 according to one embodiment of the invention, and FIG. 1 is a perspective view showing the disk drive 1 obtained by assembling components, with a top cover 33 removed. The disk drive 1 in this embodiment is a storage medium conforming to the Compact Flash Type 2 standards, and a portable precision device includes a functional unit 10, i.e., a built-in recording/reproducing unit for recording and reproducing data, and a card assembly 20 including circuits for driving and controlling the functional unit 10 and data input/output operation. The functional unit 10, the card assembly 20 and the like are contained in a case. The card assembly 20 includes a wiring board 21 provided on one side thereof with a connector (interface connector) 22 meeting function and construction having a form factor specified by Compact Flash Type 2 standards.

The functional unit 10 includes a magnetic disk (disk) 11, i.e., a data storage medium, supported for rotation; an actuator assembly 12 supporting on its tip part a read/write head for reading data from and writing data to the magnetic disk 11; a VCM assembly 13 including a VCM coil and a VCM magnet; a top clamp 14 for clamping the magnetic disk 11 mounted on a spindle motor, not shown; a ramp mechanism 15 for supporting the read/write head when the read/write head is retracted from the magnetic disk 11; and a latching mechanism 16, such as a magnetic latch or an inertia latch, for holding the read/write head on the ramp mechanism 15 when the disk drive 1 is inoperative.

A case includes a frame bumper 30 having a form factor specified by the Compact Flash Type 2 standards, and formed of an elastic member as a shock-absorbing member (cushioning member), a bottom cover 31 for supporting the components of the disk drive 1, a shallow, box-shaped base plate 32 containing the components of the functional unit 10, and a top cover 33 for covering the functional unit 10 contained in the base plate 32.

Bottom cover fastening screws 34 are passed through the bottom cover 31, the card assembly 20 and the frame bumper 30, and are screwed in threaded holes formed in the base plate 32 to fasten together the bottom cover 31, the card assembly 20, the frame bumper 30 and the base plate 32. The top cover 33 is fastened to the base plate 32 with top cover fastening screws 35. A burring into which the bottom cover fastening screw 34 is extendedly screwed is formed at each of four corners of the base plate 32 toward the bottom cover. A burring 321 into which the top cover fastening screw 35 is screwed is extendedly formed toward the top cover at each of the positions (at a flat portion in a step) at which the top cover 33 is screwed, each of the burrings being internally threaded on its inner wall.

A burring 331 is formed extendedly upward on a flat portion in a recess formed on each of three corners of the top cover 33 by pressing. The burring 331 has a diameter larger than that of the burring 321 of the base plate so that the burring 321 of the base plate 32 is fitted thereinto. A covering seal 36 is provided for covering gaps between edges of the top cover 33 and the base plate 32 and heads of the top cover screws 35 after the top cover 33 is attached to the base plate 32.

Although the burrings 331 are formed on the top cover 33 in this embodiment, the burrings 331 may be omitted and replaced by holes.

The base plate 32 has hitherto been an aluminum casting made by die casting aluminum. Aluminum castings formed by die casting have very low shock resistance. This embodiment employs the frame bumper 30 formed of a shock absorbing material instead of a cast frame. The base plate 32 can be formed by processing a metal sheet by press working, and the shock-absorbing frame bumper 30 is used instead of thick parts formed by casting. Thus, the base plate 32 can be manufactured at a low manufacturing cost.

Each of the burrings of the base plate 32 is formed by boring a hole for forming the burring, followed by scraping using a rod-shaped tool having a diameter identical with a desired diameter of the burring with the hole being used as a base point. On an inner wall of each of the burrings, an internal thread is cut so as to provide the bottom cover fastening screw 34 and the top cover fastening screw 35 into the burrings. The number of ridges of the internal thread formed on the base plate 32 is insufficiently provided due to the small thickness of the base plate, but it is possible to increase the number of ridges of the internal thread by providing the burrings. A height of the burring 321 is lower than the flat portion of a periphery of the base plate 32. As a result of forming the burrings, such components for fastening the bottom cover fastening screw 34 and the top cover fastening screw 35 as nuts are unnecessary.

Figure 8:
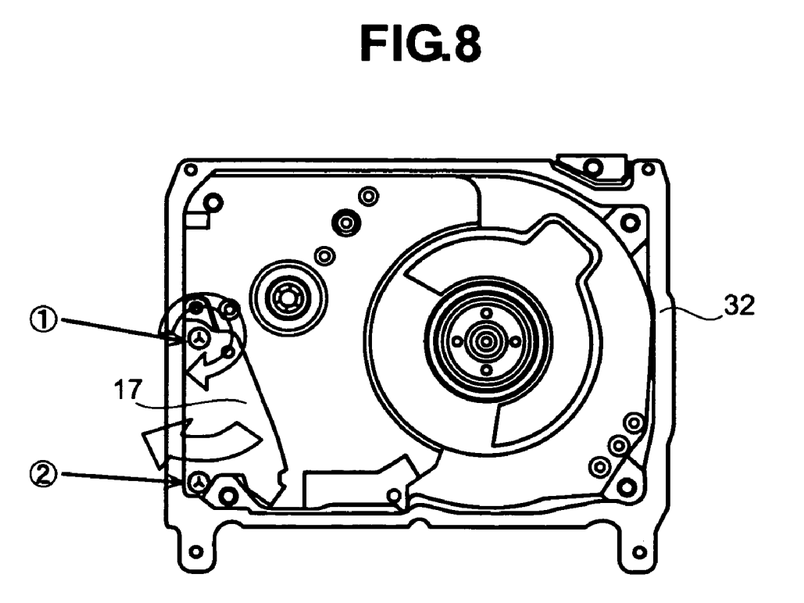
FIG. 8 is a diagram for explaining a process of attaching the FC plate to the base plate according to the embodiment of the present invention.

A plurality of bosses 323 are formed on a bottom face of a corner of the base plate 2 by pressing, the bosses 323 being used for pressing and fixing a bracket for holding a filter. On a bottom of a corner diagonal to the formerly mentioned corner of the base plate 2, a plurality of bosses (not shown in FIG. 4, but shown in FIG. 8) are formed to be used for positioning a lower yoke of the VCM when fixing the same.

Figure 2:
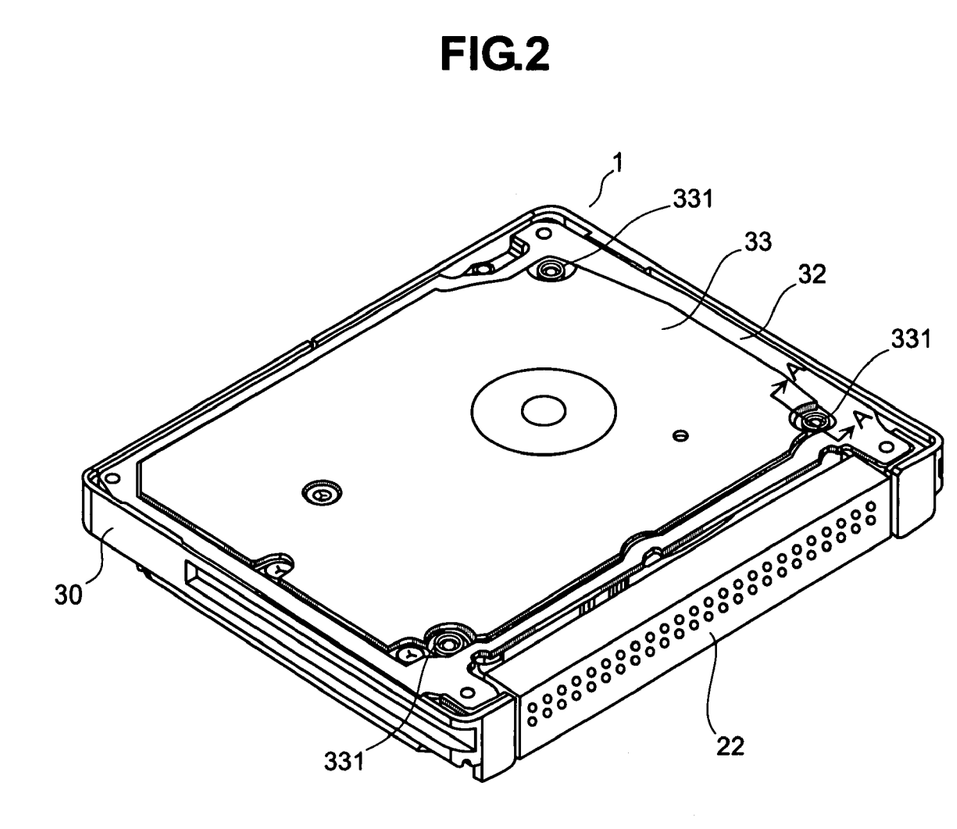
FIG. 2 is a perspective view showing a state in which a top cover is attached to the disk drive of FIG. 1.

FIG. 2 shows a state in which the tope cover 33 covers the base plate 32. The burrings 321 of the base plate 32 are fitted into the burrings 331 of the top cover 33. Therefore, the top cover 33 is positioned accurately with respect to the base plate, and the top cover fastening screws 35 are screwed in the state where the top cover 33 is thus positioned.

Figure 3:
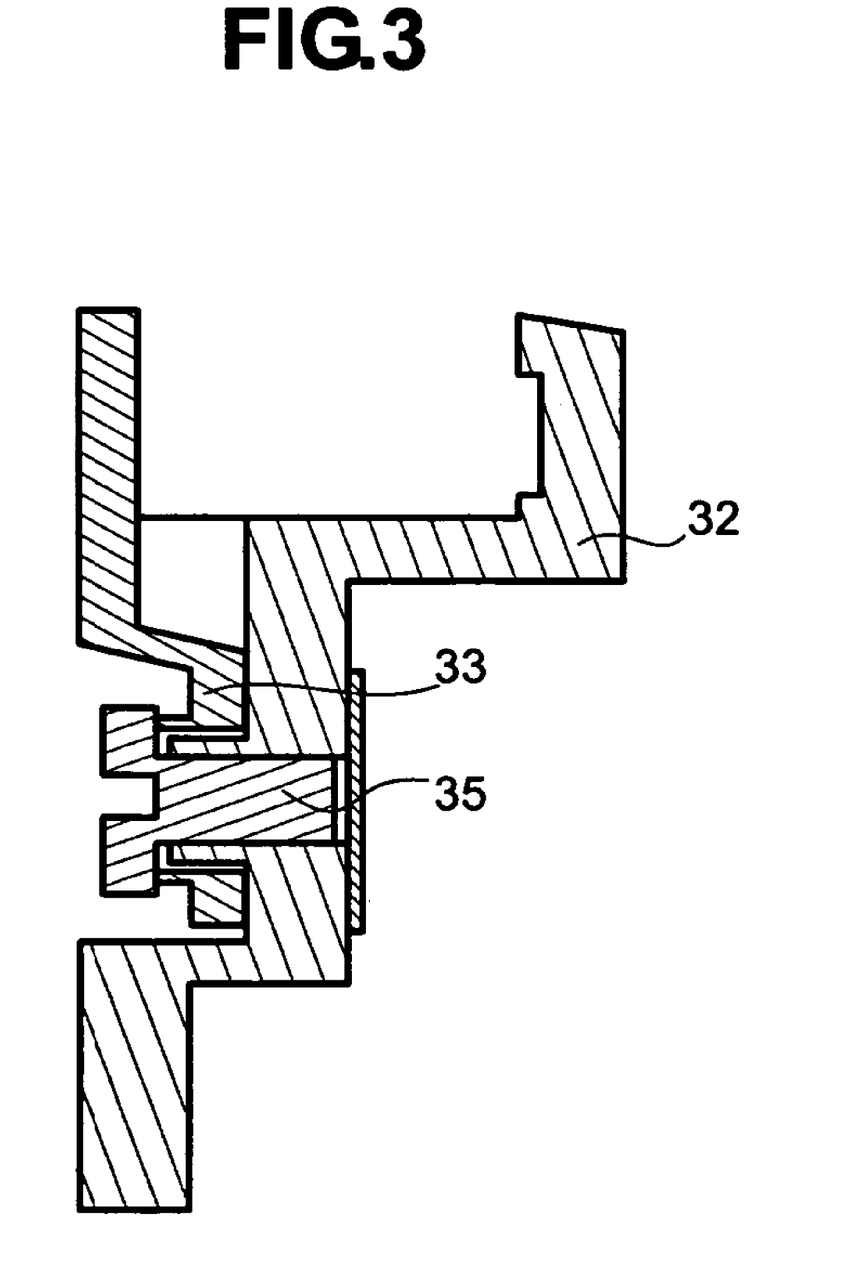
FIG. 3 is a sectional view taken along line A-A of FIG. 2.

FIG. 3 is a cross-sectional view taken along line A-A of FIG. 2, wherein the top cover fastening screw 35 is screwed. From FIG. 3, it is understood that the burring 321 of the base plate 32 is fitted into the burring 331 of the top cover 33, and the top cover fastening screw 35 is screwed into the burring 321 of the base plate 32. Here, flat portions of the base plate 32 and the top cover 33 and heads of the top cover fastening screws 35 are substantially level with one another.

Since the base plate 32 is formed by pressing, an edge of the pressed portion is curved. Accordingly, in the case where the burring is not formed on the base plate 32, it is difficult to position the top cover 33 on the base plate 32, thereby deteriorating working efficiency. Further, a gap may be undesirably defined between the base plate 32 and the edges of the top cover 33 after the screw-fastening. In this embodiment, the burrings solve the above problems.

Referring to FIG. 1, the frame bumper 30 makes use of a space produced by the alteration in the base plate 32 and has a function of a shock-absorbing member, the frame bumper being a molded component having a side slot which is required to be in conformity with the Compact Flash Type-2 standards. This molded component is formed from a thermoplastic elastomer such as a polyester elastomer and has a moderate elasticity as well as an excellent dimensional stability after molding.

The frame bumper 30 is designed to be larger than the base plate 32. For example, a periphery of the frame bumper 30 is larger than that of the base plate 32 by about 0.5 to 1 mm and is substantially level with the surface of the connector 22. Corners of the frame bumper 30 are increased in thickness taking into consideration that the impact is most liable to be given on the corners. By thus covering the periphery (side in the two dimensional directions of the external form) with the frame bumper 30 and the connector 22, it is possible to protect the disk drive 1 from the side impact.

Figure 5:
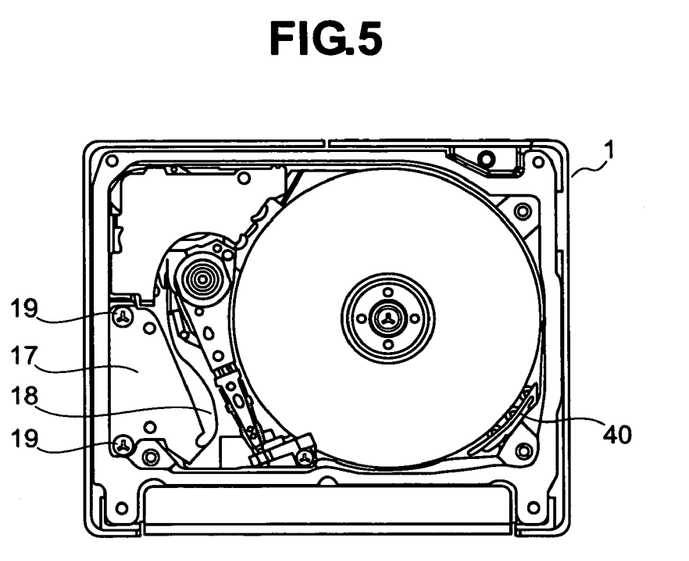
FIG. 5 is a top view showing the internal structure of the dirk drive according to the FIG. 6 is a diagram showing a position relationship between a base plate and an FC plate according to the embodiment of the present invention.

Shown in FIG. 5 is a top face of the disk drive 1 with the top cover 33 removed. Signals from/to the read/write head are transmitted by an FC (flex cable) 18. The FC 18 is connected to an FC substrate near the actuator assembly 12 as well as to the connector near an FC plate 17 and is movable in accordance with the rotation of the actuator assembly 12. In the case where the attachment position of the FC plate 17 is in error, such erroneous positioning affects the movement of the FC 18 or, in the worst situation, the FC 18 can be brought into contact with the actuator assembly 12 or the magnetic disk 11 in rotation. Therefore, it is necessary to accurately position the FC plate 17 on the base plate 32.

Figure 6:
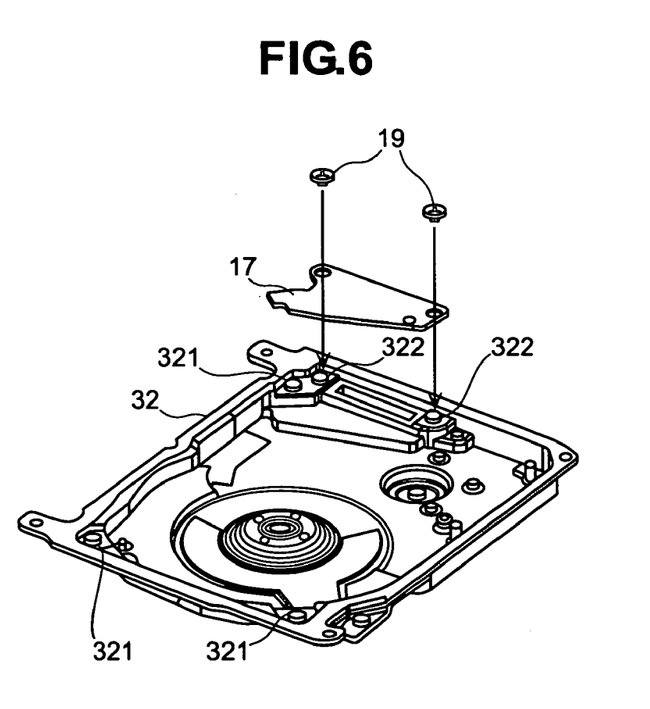
Figure 7:
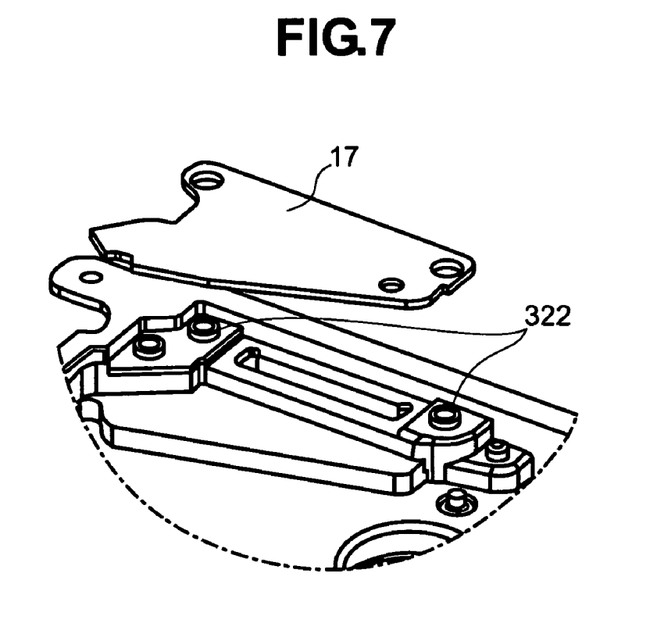
FIG. 7 is an enlarged view showing part of FIG. 6.

FIG. 6 is a diagram for explaining the attachment of the FC plate 17 to the base plate 32 according to the specific embodiment of the present invention. FIG. 7 is a partially enlarged view. Burrings 322 are formed on the base plate 32 at the attachment positions of the FC plate 17, and an internal thread is cut on an inner wall of each of the burrings 322. Holes having a diameter larger than that of the burrings 322 are formed in the FC plate 17.

First, the FC plate 17 is positioned in such a manner that the burrings 322 of the base plate 32 penetrate through the holes of the FC plate 17. Then screws 19 are fastened in directions indicated by arrows and in the order of (1) and (2) shown in FIG. 8, thereby fixing the FC plate 17 to the base plate 32 in such a fashion that the FC plate 17 is in contact with a wall of the base plate, i.e., to the accurate position. Further, since the FC plate 17 is positioned on the flat surface of the base plate 32 at roots of the burrings 32 (see FIG. 7), a dimensional accuracy in height is also improved.

Referring back to FIG. 5, the bracket 40 for holding the filter is disposed at one corner nearer to the disk 11 and the connecter 22 of the disk drive 1 and along an outer periphery of the disk 11. The filter is cased in the bracket 40 as being in the shape of an arch. The bracket 40 has a plurality of grooves formed at its bottom and is pressed into the bosses 323 (see FIG. 1) formed on the base plate 32, so that the bracket 40 is fixed to the base plate 32 using the grooves.

Figure 9A:
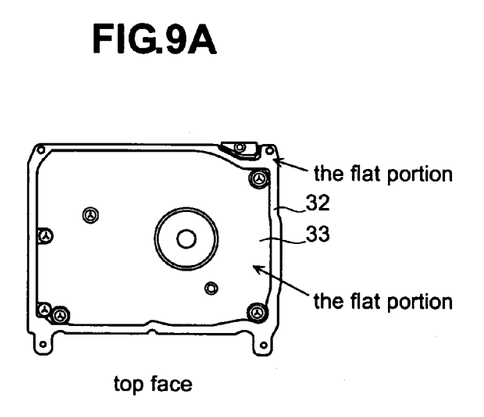
FIG. 9A to 9D are diagrams showing a sealing structure according to the embodiment of the present invention.
Figure 9B:
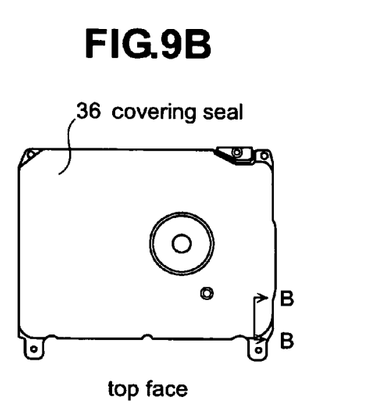
Figure 10:
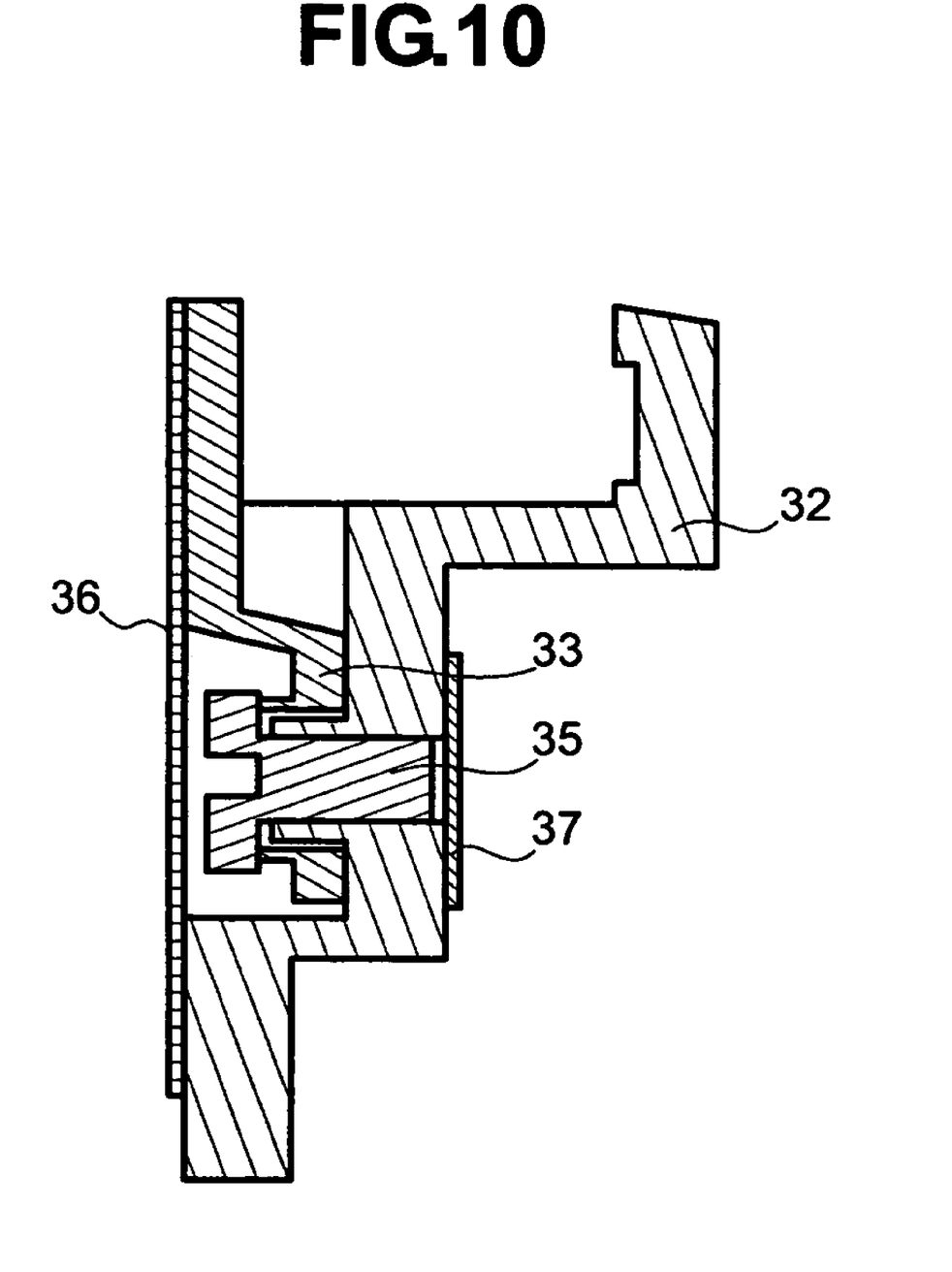
FIG. 10 is a sectional view taken along line B-B of FIG. 9.

Shown in FIG. 9A is a top face of the disk drive 1 in a state where the top cover 33 is attached to the base plate 32 with the top cover fastening screws 35. A slight gap may be in some cases generated between the base plate 32 and the edges of the top cover 33. In order to prevent the entry of foreign matters such as dust from the gap, the covering seal 36 is applied on the disk drive 1 in such a fashion as to cover the whole top face as shown in FIG. 9B. Referring to FIG. 10 showing a section taken along line B-B of FIG. 9B, since the flat portion of the base plate 32, the flat portion of the top cover 33, and the heads of the top cover screws 35 are substantially level with one another, it is possible to stick the covering seal 36 without a gap. Thus, the hermeticity is improved.

Figure 9C:
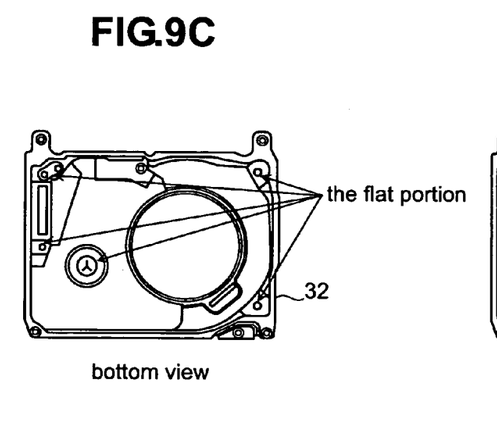
Figure 9D:
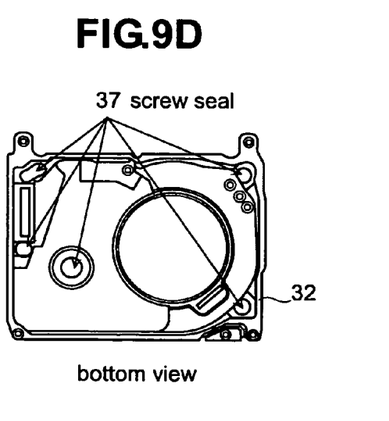

FIG. 9C is a bottom view of the base plate 32. A screw seal 37 is applied on each of the flat portions (for screwing) of a rear face of the base plate 32 at which the burrings are formed and a flat portion at which the actuator assembly 12 is pivotally mounted as shown in FIG. 9D. As the covering seal 36 and the screw seals 37, an adhesive tape is appropriately used because it is sufficiently thin, less bulky in height, easily stripped off, and easily reapplied.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
   a functional unit including a disk as an information storage medium;
   a case configured to contain the functional unit; and
   a cover configured to cover the functional unit contained in the case;
   wherein the case includes a burring having an internal thread cut on an inner wall thereof, the burring being formed on a region at which the cover is attached to the case, wherein the inner wall projects in a direction from a surface of the region toward the cover; and
   wherein the cover is screw-fastened at the burring, wherein the cover has a flat portion received in each recess formed on respective fastening regions of the cover and at which the cover is screw-fastened to the case;
wherein the flat portion includes:
   a burring having a diameter larger than a diameter of the burring of the case and having an inner wall projecting in the same direction as the burring of the case; and
wherein the burring of the case is fitted into the burring of the cover to be screw-fastened.

2. The disk drive according to claim 1,
wherein top faces of the case, the cover, and the fastening regions are covered with a seal; and
wherein the fastening regions on a bottom face of the case are covered with seals.

3. The disk drive according to claim 2, wherein each of the seals comprises an adhesive tape.

4. A disk drive comprising:
a disk;
a head;
a cable plate configured to hold a connector to which a cable for transmitting a signal from the head is connected;
a case configured to contain the disk, the head, and the cable plate; and
a cover configured to cover the disk, the head, and the cable plate contained in the case;
wherein the case includes a first burring having an internal thread cut on a first inner wall thereof, the first burring being formed on a first region at which the cable plate is attached to the case, wherein the first inner wall projects in a direction from a surface of the first region toward the cable plate;
wherein the cable plate is screw-fastened at the first burring;
wherein the case includes a second burring having an internal thread cut on a second inner wall thereof, the second burring being formed on a second region at which the cover is attached to the case, wherein the second inner wall projects in a direction from a surface of the second region toward the cover;
wherein the cover is screw-fastened at the second burring;
wherein the cover has a flat portion received in each recess formed on respective fastening regions of the cover and at which the cover is screw-fastened to the case;
wherein the flat portion includes:
   a third burring having a diameter larger than a diameter of the second burring and having an inner wall projecting in the same direction as the second burring; and
wherein the second burring is fitted into the third burring to be screw-fastened.

5. The disk drive according to claim 4,
wherein top faces of the case, the cover, and the fastening regions are covered with a seal; and
wherein the fastening regions on a bottom face of the case are covered with seals.

6. The disk drive according to claim 5, wherein each of the seals comprises an adhesive tape.

7. A disk drive comprising:
a functional unit including a disk as an information storage medium;
a case configured to contain the functional unit;
a cover configured to cover the functional unit contained in the case;
a wiring board at one of whose edges a connector is disposed, the wiring board being attached to the case; and
a shock absorbing member configured to cover sides of the case other than a side at which the connector is located;
wherein the case includes a burring having an internal thread cut on an inner wall thereof, the burring being formed on a region at which the cover is attached to the case, wherein the inner wall projects in a direction from a surface of the region toward the cover;
wherein the cover is screw-fastened at the burring;
wherein the cover has a flat portion received in each recess formed on respective fastening regions of the cover and at which the cover is screw-fastened to the case;
wherein the flat portion includes:
   a burring having a diameter larger than a diameter of the burring of the case and having an inner wall projecting in the same direction as the burring of the case; and
wherein the burring of the case is fitted into the burring of the cover to be screw-fastened.

8. The disk drive according to claim 7,
wherein top faces of the case, the cover, and the fastening regions are covered with a seal; and
wherein the fastening regions on a bottom face of the case are covered with seals.

9. The disk drive according to claim 8, wherein each of the seals comprises an adhesive tape.

10. A disk drive comprising:
a bottom cover;
a wiring board at one of whose edges a connector is disposed, the wiring board being contained in the bottom cover;
a base plate disposed on the wiring board in such a fashion that the connector is located at one side thereof;
a disk and a head contained in the base plate,
a top cover conjured to cover a top face of the base plate; and
a shock-absorbing member configured to cover sides of the base plate other than the side at which the connector is located;
wherein the base plate includes a burring having an internal thread cut on an inner wall thereof, the burring being formed on a region at which the top cover is screw-fastened to the base plate, wherein the inner wall projects in a direction from a surface of the region toward the cover;
wherein the top cover is screw-fastened at the burring;
wherein the top cover has a flat portion received in each recess formed on respective fastening regions of the top cover and at which the top cover is screw-fastened to the base plate;
wherein the flat portion includes:
   a burring having a diameter larger than a diameter of the burring of the base plate and having an inner wall projecting in the same direction as the buffing of the base plate; and
wherein the burring of the base plate is fitted into the burring of the top cover to be screw-fastened.

11. The disk drive according to claim 10,
wherein top faces of the base plate, the top cover, and the fastening regions are covered with a seal; and
wherein the fastening regions on a bottom face of the base plate are covered with seals.

12. The disk drive according to claim 11, wherein each of the seals comprises an adhesive tape.

13. A magnetic disk drive comprising:
a bottom cover;
a wiring board at one of whose edges a first connector is disposed, the wiring board being contained in the bottom cover;

a base plate disposed on the wiring board in such a fashion that the first connector is located at one side thereof;

a magnetic disk and a head contained in the base plate;

a cable plate configured to hold a second connector to which a cable for transmitting a signal from the head is connected;

a top cover configured to cover top faces of the magnetic disk, the head, and the cable plate; and a frame bumper configured to cover sides of the base plate other than the side at which the first connector is located, the frame bumper being a shock-absorbing member; wherein the base plate includes a first burring having an internal thread cut on a first inner wall thereof, the first burring being formed on a first region at which the cable plate is attached to the base plate, wherein the first inner wall projects in a direction from a surface of the first region toward the cable plate;

wherein the cable plate is screw-fastened at the first burring;

wherein the base plate includes a second burring having an internal thread cut on a second inner wall thereof, the second burring being formed on a region at which the top cover is attached to the base plate, wherein the second inner wall projects in a direction from a surface of the second region toward the top cover;

wherein the top cover is screw-fastened at the second burring;

wherein the top cover has a flat portion received in each recess formed on respective fastening regions of the top cover and at which the top cover is screw-fastened to the base plate;

wherein the flat portion includes:

a third burring having a diameter larger than a diameter of the second burring and having an inner wall projecting in the same direction as the second burring; and wherein the second burring is fitted into the third burring to be screw-fastened.

14. The magnetic disk drive according to claim 13, wherein top faces of the base plate, the cover, and the fastening regions are covered with a seal; and wherein the fastening regions on a bottom face of the base plate are covered with seals.

15. The magnetic disk drive according to claim 14, wherein each of the seals comprises an adhesive tape.

* * * * *

UNITED STATES PATENT AND TRADEMARK OFFICE
CERTIFICATE OF CORRECTION

PATENT NO. : 7,428,122 B2
APPLICATION NO. : 10/884235
DATED : September 23, 2008
INVENTOR(S) : Shinichi Kimura et al.

It is certified that error appears in the above-identified patent and that said Letters Patent is hereby corrected as shown below:

In the Claims:

Claim 10, Column 8, Line 52, please delete "buffing" and insert --burring--.

Signed and Sealed this

Thirtieth Day of December, 2008

JON W. DUDAS
*Director of the United States Patent and Trademark Office*